United States Patent [19]

Carroll

[11] Patent Number: 5,079,815
[45] Date of Patent: Jan. 14, 1992

[54] METHOD OF MAKING A CASSETTE REEL SPRING HAVING ROLLED EDGES

[75] Inventor: William M. Carroll, Milwaukee, Wis.

[73] Assignee: Koller Manufacturing Corporation, Milwaukee, Wis.

[21] Appl. No.: 611,452

[22] Filed: Nov. 9, 1990

Related U.S. Application Data

[60] Continuation of Ser. No. 460,298, Jan. 3, 1990, abandoned, which is a division of Ser. No. 301,389, Jan. 25, 1989, Pat. No. 4,903,916.

[51] Int. Cl.$^5$ .............................................. B23P 13/00
[52] U.S. Cl. ...................................... 29/173; 72/379.2; 360/132
[58] Field of Search .................... 29/173; 267/47, 158, 267/164; 242/199; 360/132; 72/379

[56] References Cited

U.S. PATENT DOCUMENTS

| | | | |
|---|---|---|---|
| 2,860,685 | 11/1958 | McDonald | 72/379 |
| 4,709,290 | 11/1987 | Schoettle et al. | 360/132 |
| 4,717,091 | 1/1988 | Schoettle et al. | 267/158 |

FOREIGN PATENT DOCUMENTS 659231 4/1979 U.S.S.R. ................................ 72/379

Primary Examiner—P. W. Echols
Attorney, Agent, or Firm—Kinzer, Plyer, Dorn, McEachran & Jambor

[57] ABSTRACT

A reel spring for a magnetic tape cassette is formed from a thin, elongated strip of stainless steel. The side edges of the strip are folded over by stamping or rolling to form longitudinal stiffeners. The stiffeners effectively increase the thickness of the strip at the edges, allowing the use of less expensive raw material without sacrificing functionality.

4 Claims, 2 Drawing Sheets

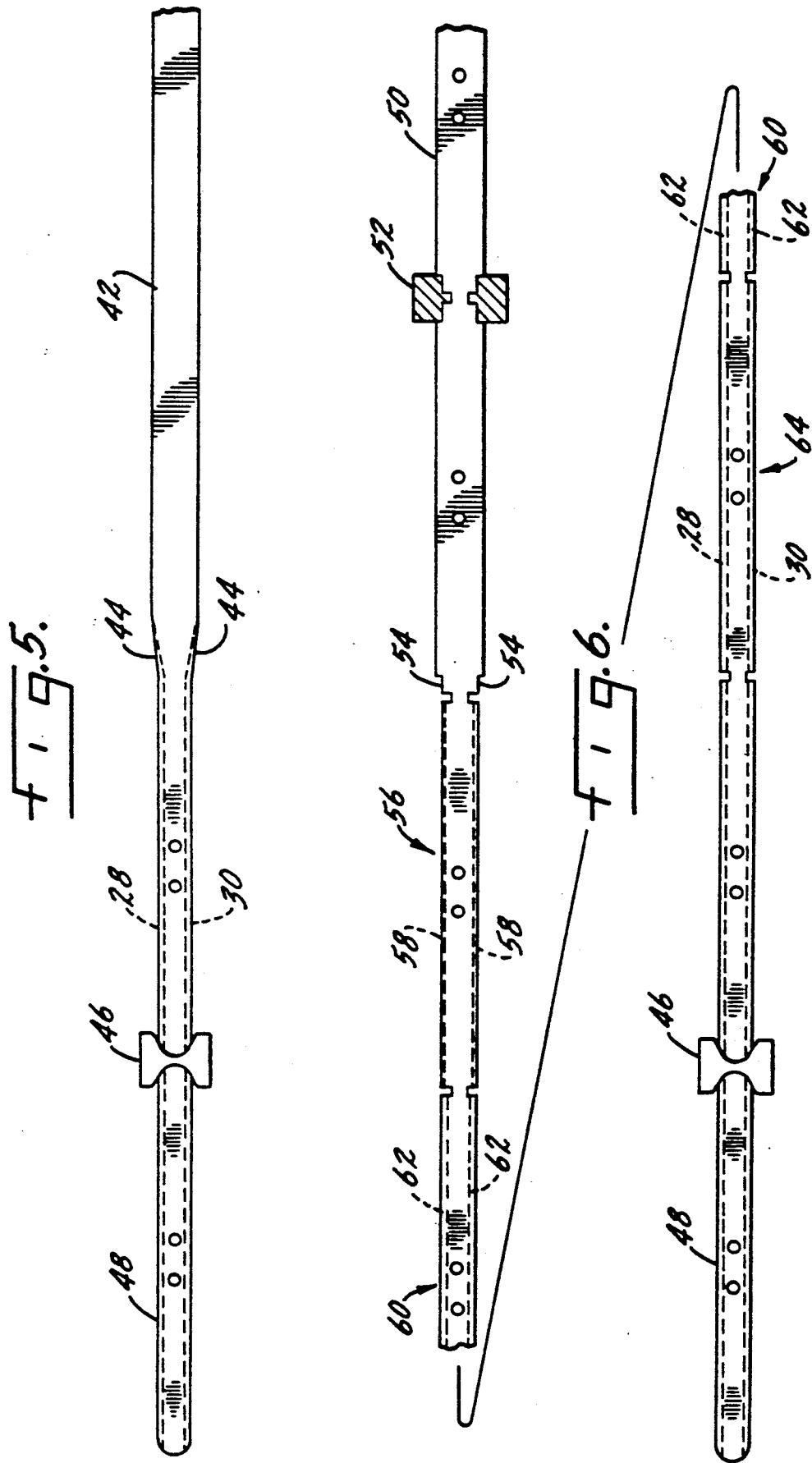

METHOD OF MAKING A CASSETTE REEL SPRING HAVING ROLLED EDGES

This is a continuation of copending application Ser. No. 07/460,298 filed on Jan. 3, 1990, now abandoned, which is a divisional of Ser. No. 07/301,389, filed Jan. 25, 1989, now U.S. Pat. No. 4,903,916.

SUMMARY OF THE INVENTION

This invention relates to reel springs used in magnetic tape cassettes. The reel spring is mounted within the cassette housing in contact with the hubs or spools of the tape reels. The spring provides a bearing surface on which the tape reels rotate. U.S. Pat. No. 4,770,367 shows a reel spring and its application in a cassette. The disclosure of that patent is incorporated herein.

The present invention concerns a reel spring configuration which permits the use of less expensive raw material, effecting cost savings in mass production of the springs. At the same time, however, the spring configuration meets all performance specifications. There is no loss of performance compared with prior art springs, nor are there adverse effects on assembly of the spring into a cassette. Similarly, the spring of the present invention lends itself to manufacture on automatic equipment of the type currently in use.

The reel spring is an elongated strip of resilient material, preferably stainless steel. The strip has first and second parallel side edges extending substantially throughout its length. First and second longitudinal stiffeners are attached to the strip adjacent the two side edges. The stiffeners may be formed by folding over the edge portions of the strip, forming fold lines along the side edges. The folding may be done by a progressive die stamping operation, by roll forming, or by any other suitable process.

The stiffeners have the effect of increasing the thickness of the strip at the location where they are attached to the strip. In the case of folded over stiffeners, the thickness is effectively doubled. The use of longitudinal stiffeners permits the strip to be formed of thinner material than previously used. For example, the strip may be stainless steel having a thickness of 0.006 inches. Currently known springs are roughly twice as thick.

BRIEF DESCRIPTION OF THE DRAWINGS

FIG. 5 is a plan view of a strip of spring material, showing the steps of a process for roll forming and stamping the strip into a finished spring.

FIG. 6 is a plan view of a strip of spring material, showing the steps of a process for progressively die stamping the strip into a finished spring.

DETAILED DESCRIPTION OF THE INVENTION

Figure 1:
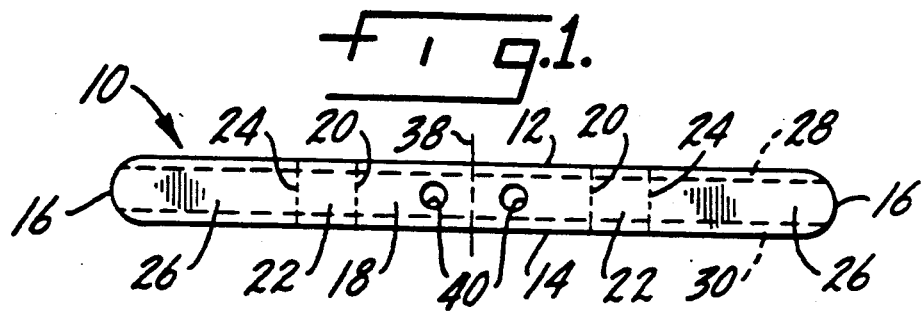
FIG. 1 is a top plan view of the spring according to the present invention.
Figure 2:
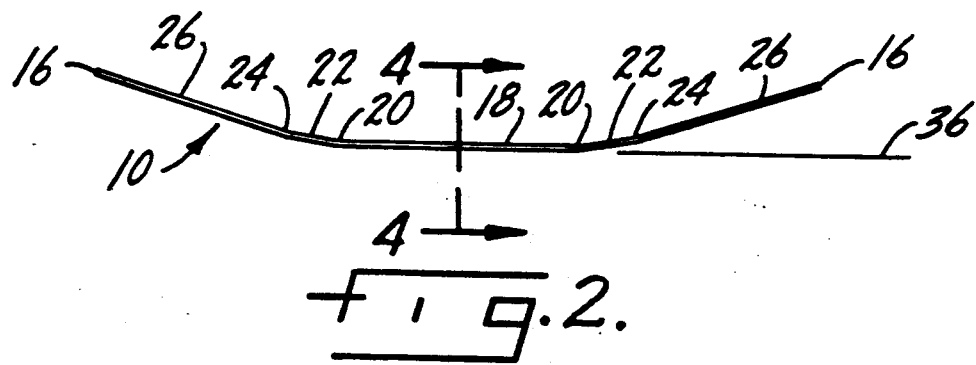
FIG. 2 is a side elevation view of the spring.
Figure 3:
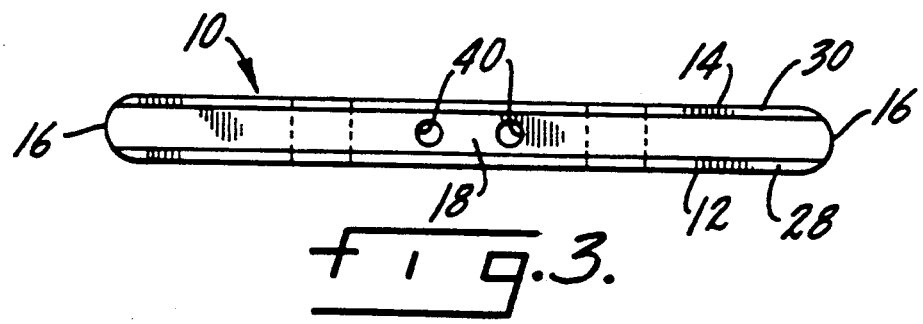
FIG. 3 is a bottom plan view of the spring.

The reel spring of the present invention is shown generally at 10 in FIGS. 1–4. The spring 10 is an elongated strip having first and second parallel side edges 12 and 14 which extend substantially throughout the entire length of the strip. The side edges are connected by rounded tips 16. The tip shape could be other than the rounded configuration shown. The spring has a flat, central base portion 18 which will adjoin an inner surface of the cassette housing when the spring is installed. A pair of transverse crimps or fold lines 20 determine the extent of the base portion 18 and define transition portions 22 of the spring. The transition sections extend out of the plane of the base at an angle of about 10°, as seen in FIG. 2. A second set of transverse crimps or fold lines 24 determines the extent of the transition sections 22. Crimps 24 define outer portions 26 of the spring which extend at a second, sharper angle to the plane of the base portion 18. This angle may be about 17°. The outer portions terminate at the rounded tips 16. Crimping the elongated strip as shown imparts an overall curved configuration to the spring.

First and second longitudinal stiffeners 28 and 30 are attached to the strip. In a preferred embodiment the stiffeners are attached along the side edges 12 and 14. This is accomplished by folding over a portion of the strip along the side edges, forming a fold line which then defines the side edge. Fold lines are shown at 32 and 34 in FIG. 4. The fold lines define the side edges of the spring.

Figure 4:
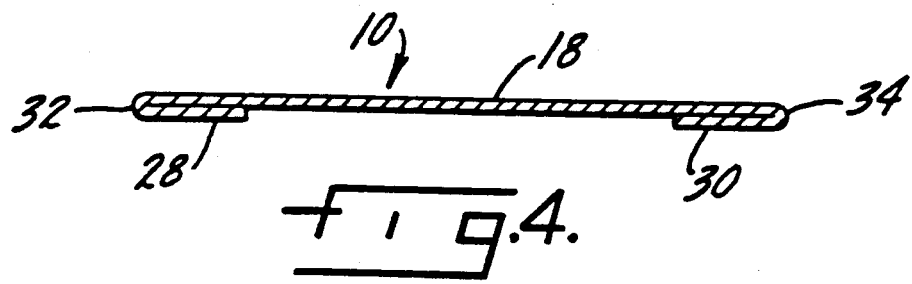
FIG. 4 is a section, on a greatly enlarged scale, taken along line 4—4 of FIG. 2.

FIG. 4 also illustrates that the stiffeners effectively increase the thickness of the strip at the point of their attachment. With the folded over configuration shown, the thickness is doubled. This permits use of thinner material than would otherwise be possible. The preferred material is stainless steel having a thickness of about 0.006 inches. This is about half the thickness required of a spring having a uniform thickness.

The use of thinner material results in significant cost savings. However, the thin spring with longitudinal stiffeners exhibits no loss of performance in operation. It is as effective in serving its function as its thicker counterparts. Nor are there any adverse effects with respect to manufacture of the spring or assembly of the spring in a cassette.

The arrangement of stiffeners could be other than as shown. For example, it is not absolutely necessary to fold over the edges to form the stiffeners. They could be separate pieces applied by adhesive or other means. Also, there could be a different number of stiffeners. For example, a single stiffener running down the center of the strip could be used. Or a third, central stiffener could be used in addition to the two shown.

For reference purposes only, the spring may be 3.937 inches long in flat condition. The tips 16 at rest extend about 0.390 inches above a base line 36 (FIG. 2). When a tip is deflected to a distance of 0.079 inches from the base line, the spring will apply a force of about 260–400 grams. These specifications for free length, free height and spring rate may vary from one particular cassette to another.

The width between edges 12 and 14 may be about 0.348 inches, with a tip radius of 0.174 inches. Crimps 20 are each about 0.625 inches from the transverse centerline 38. Crimps 24 are about 0.938 inches from the transverse centerline. Both of these measurements are in the after-crimped condition. The overall length after crimping is 3.830 inches. The stainless steel thickness is about 0.006 inches. The width of the stiffeners is 0.060 inches.

A pair of mounting holes 40 are provided in the base to facilitate attachment of the spring to the cassette section. The holes have a diameter of about 0.128 inches.

FIG. 5 illustrates a roll forming process for fabricating the spring of the present invention. A strip 42 of spring material is fed into roll former tooling (not shown). The roll former tooling turns down the edges of the strip, as indicated at 44, to form the longitudinal stiffeners 28 and 30. The strip is advanced to a cut-off station where a severing tool 46 cuts a spring blank 48 off the end of the strip. The blank may then be crimped to impart the curved configuration. Details of the severing and crimping operation may be as described in U.S. Pat. No. 4,845,820 and assigned to the present assignee. The disclosure of that patent is incorporated by reference herein.

FIG. 6 illustrates an alternate process for fabricating the spring. This is a progressive die stamping operation. The strip material 50 is fed to a trimming tool 52 which forms a notched cutout 54 in both edges of the strip. The strip advances to a folding station at 56 where portions 58 of the side edges between successive cutouts 54 are folded down 90°. At the next station 60 the folded portions 58 are cammed in to create precursors of the stiffeners. These are shown at 62. At station 64 the precursors 62 are coined flat to form the stiffeners 28 and 30. Then the strip is advanced to the cut-off station where severing tool 46 removes a spring blank 48 for finishing as described above.

Whereas a preferred form of the invention has been shown and described, it will realized that modifications may be made thereto without departing from the scope of the following claims.

I claim:

1. A method of fabricating a reel spring for a magnetic tape cassette, comprising the steps of:

feeding an elongated strip of resilient material having first and second side edges into shaping tooling for folding at least one side edge of the spring material 180° back over the strip to form at least one longitudinal stiffener;

severing an individual spring blank from the end of the strip; and forming the blank into a finished spring.

2. The method of claim 1 wherein both side edges are folded over to form two longitudinal stiffeners.

3. The method of claim 1 wherein the shaping tooling is a progressive die.

4. The method of claim 1 wherein the shaping tooling is roll former tooling.

* * * * *